(12) United States Patent
Ura et al.

(10) Patent No.: US 9,434,434 B2
(45) Date of Patent: Sep. 6, 2016

(54) CENTRALIZED UNLOCKING OPERATION APPARATUS FOR VEHICLE LOCKING MECHANISM

(71) Applicant: KABUSHIKI KAISHA HONDA LOCK, Miyazaki (JP)

(72) Inventors: Kengo Ura, Miyazaki (JP); Takenobu Kuroiwa, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 109 days.

(21) Appl. No.: 14/387,614

(22) PCT Filed: Jan. 9, 2013

(86) PCT No.: PCT/JP2013/050221
§ 371 (c)(1),
(2) Date: Sep. 24, 2014

(87) PCT Pub. No.: WO2013/145795
PCT Pub. Date: Oct. 3, 2013

(65) Prior Publication Data
US 2015/0020559 A1    Jan. 22, 2015

(30) Foreign Application Priority Data

Mar. 28, 2012   (JP) ................................ 2012-074056

(51) Int. Cl.
*B62H 5/00*      (2006.01)
*E05B 85/00*    (2014.01)
(Continued)

(52) U.S. Cl.
CPC ................ *B62H 5/00* (2013.01); *B62K 19/30* (2013.01); *E05B 85/00* (2013.01); *B60K 15/0406* (2013.01); *B62J 35/00* (2013.01); *B62K 19/46* (2013.01); *Y10T 70/65* (2015.04)

(58) Field of Classification Search
CPC ......... B62H 5/00; E05B 85/00; E05B 65/12; Y10T 70/65; B60R 25/00; B62J 6/16; B62J 1/12; B62J 99/00; B62J 35/00; B62K 19/30; B62K 19/46; B60K 15/0406
USPC .......................................................... 70/264
See application file for complete search history.

(56) References Cited

U.S. PATENT DOCUMENTS 4,142,167 A * 2/1979 Little ................... H01H 50/326
                                                    200/19.13
4,907,428 A * 3/1990 Nakashima ................ B62J 9/00
                                                       180/219

(Continued)

FOREIGN PATENT DOCUMENTS

CN       101603389 A     12/2009
CN       101855128 A     10/2010
(Continued)

OTHER PUBLICATIONS

Official communication dated Dec. 9, 2015 in regards to corresponding Chinese patent application No. 201380016485.7.
(Continued)

*Primary Examiner* — Suzanne Barrett
(74) *Attorney, Agent, or Firm* — Carrier Blackman & Associates, P.C.; Joseph P. Carrier; Jingli Wang

(57) ABSTRACT

In a centralized unlocking apparatus for a vehicle locking mechanism in which the operation of an operator in an operating portion capable of placing a locking mechanism in unlocked state is regulated when a main switch is in a predetermined rotary operation position, a pair of operating portions each provided with an operator is disposed on both sides of a main switch. Thus, the number of locking mechanisms that can be operated into unlocked state can be increased.

10 Claims, 8 Drawing Sheets

(51) Int. Cl.
    *B62K 19/30*     (2006.01)
    *B60K 15/04*     (2006.01)
    *B62J 35/00*     (2006.01)
    *B62K 19/46*     (2006.01)

(56) References Cited

U.S. PATENT DOCUMENTS

| | | | |
|---|---|---|---|
| 6,662,608 B1 * | 12/2003 | Baukholt | E05B 81/06 292/201 |
| 7,448,663 B2 * | 11/2008 | Fujimoto | B62H 5/006 292/150 |
| 2007/0247280 A1 | 10/2007 | Nakamura | |
| 2015/0020559 A1 * | 1/2015 | Ura | B62H 5/00 70/264 |

FOREIGN PATENT DOCUMENTS

| | | |
|---|---|---|
| EP | 1055593 A2 | 11/2000 |
| JP | 2001213370 A | 8/2001 |
| JP | 3404250 B2 | 5/2003 |
| JP | 2008-230293 A | 10/2008 |
| JP | 4236094 B2 | 3/2009 |
| JP | 2009-299318 A | 12/2009 |
| JP | 4683479 B2 | 5/2011 |

OTHER PUBLICATIONS

Official Communication dated Oct. 28, 2015 corresponding to European Application No. EP 13 76 9542.

* cited by examiner

CENTRALIZED UNLOCKING OPERATION APPARATUS FOR VEHICLE LOCKING MECHANISM

TECHNICAL FIELD

The present invention relates to a centralized unlocking operation apparatus for a vehicle locking mechanism, the apparatus including a main switch that is pivotingly operated, and an operating section that enables a plurality of locking mechanisms to be put into an unlocked state by means of an associated operating element and that restricts operation of the operating element when the main switch is at a predetermined pivoted position.

BACKGROUND ART

An arrangement for determining the feasibility of operating an operating section that enables a riding seat locking mechanism and a fuel filler cap locking mechanism in a motorcycle to be operated so as to be put into an unlocked state by pivoting a rotor of a key cylinder of a main switch to a predetermined position by operating a key is already known from Patent Document 1 and Patent Document 2.

RELATED ART DOCUMENTS

Patent Documents

Patent Document 1: Japanese Patent No. 4683479
Patent Document 2: Japanese Patent Application Laid-open No. 2009-299318

DISCLOSURE OF INVENTION

Problems to be Solved by the Invention

In the arrangements disclosed in Patent Documents 1 and 2, the operating section is disposed on only one side of the main switch, and there is a limit to the number of locking mechanisms as targets for operation.

The present invention has been accomplished in light of such circumstances, and it is an object thereof to provide a centralized unlocking operation apparatus for a vehicle locking mechanism that can increase the number of locking mechanisms that can be operated so as to be put into an unlocked state.

Means for Solving the Problems

In order to attain the above object, according to a first aspect of the present invention, there is provided a centralized unlocking operation apparatus for a vehicle locking mechanism, the apparatus comprising a main switch that is pivotingly operated, and an operating section that enables a plurality of locking mechanisms to be put into an unlocked state by a single operating element and that restricts operation of the operating element when the main switch is at a predetermined pivoted position, characterized in that a pair of the operating sections each comprising the operating element are disposed on opposite sides of the main switch.

Further, according to a second aspect of the present invention, in addition to the first aspect, a pair of restricting members are provided between a cam member that pivots in response to a pivoting operation of the main switch and the pair of operating sections such that one end of each of the restricting members abuts against an outer periphery of the cam member, the restricting members being capable of changing positions thereof in response to the pivoting position of the cam member between an operation allowed position in which operation of the operating element is allowed and an operation restricted position in which operation of the operating element is restricted by engagement with the operating element.

Furthermore, according to a third aspect of the present invention, in addition to the second aspect, a cam portion against which one end of one of the restricting members is made to abut and a cam portion against which one end of the other restricting member is made to abut are formed on the outer periphery of the cam member so as to be separated in an axial direction.

Effects of the Invention

In accordance with the first aspect of the present invention, since the pair of operating sections that enable the plurality of locking mechanisms to be put into an unlocked state are disposed on opposite sides of the main switch, it is possible to increase the number of locking mechanisms that can be operated so as to be put into an unlocked state.

Furthermore, in accordance with the second aspect of the present invention, it becomes possible to restrict operation of the pair of operating sections in response to the pivoted position of the main switch by means of a simple arrangement in which the pair of restricting members that change their position between the operation allowed position and the operation restricted position in response to the pivoting position of the cam member pivoting in response to a pivoting operation of the main switch are provided between the cam member and the pair of operating sections.

Moreover, in accordance with the third aspect of the present invention, since the cam portion against which one end of one restricting member is made to abut and the cam portion against which one end of the other restricting member is made to abut are formed on the outer periphery of the cam member so as to be separated in the axial direction, even when the pivoted positions of the main switch for carrying out restriction of operation of the pair of operating sections are different from each other, it is possible to mutually independently set restriction of operation of the two operating sections.

Figure 1:
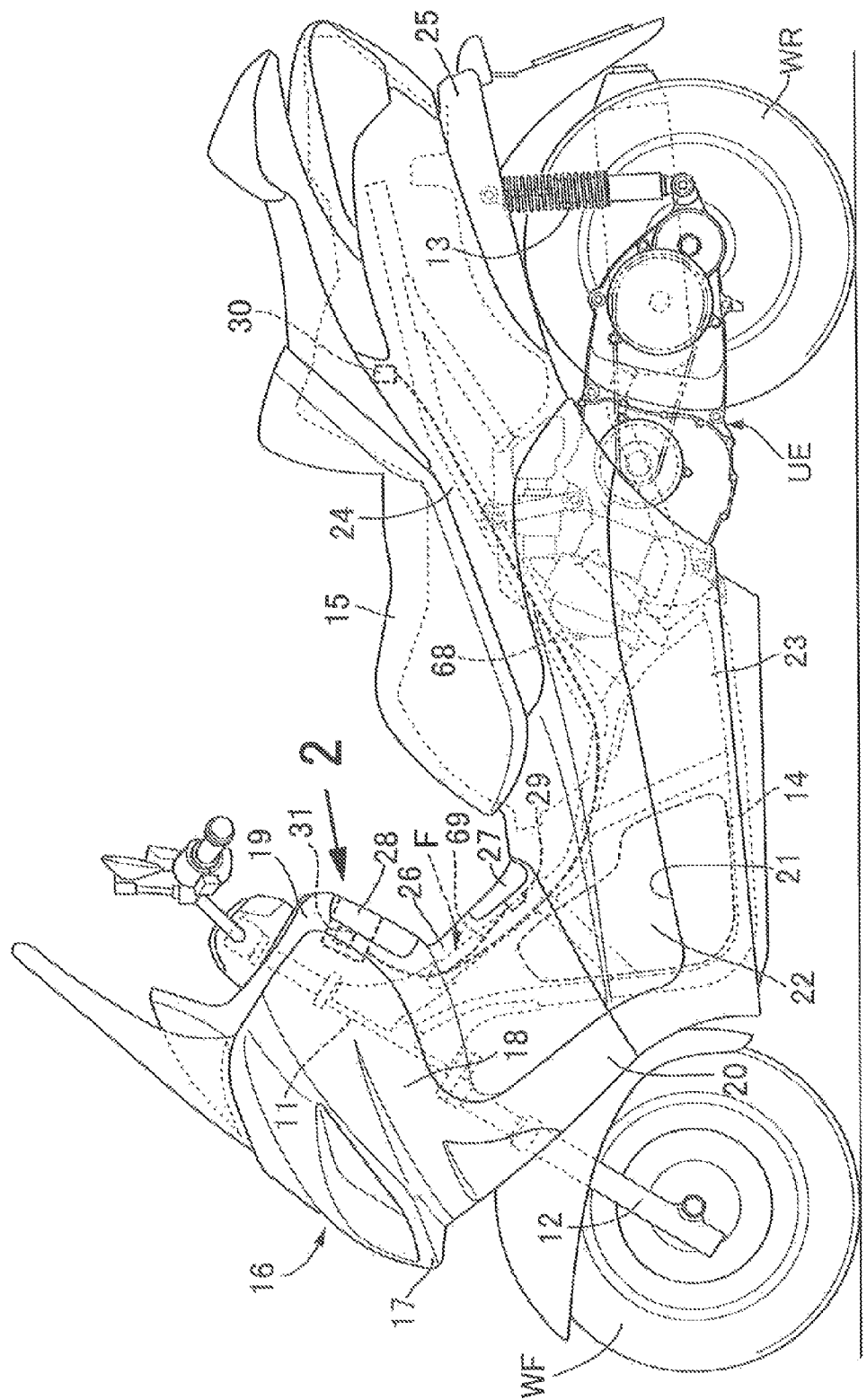
FIG. 1 is a side view of a scooter type motorcycle. (first embodiment)

EXPLANATION OF REFERENCE NUMERALS
AND SYMBOLS 29, 30, 31 Locking mechanism
32 Centralized unlocking operation apparatus
33 Main switch
34A, 34B Operating section
50 Cam member
54A, 54B Operating element
70A, 70B Restricting member
73A, 73B Cam portion

MODE FOR CARRYING OUT THE INVENTION

A mode for carrying out the present invention is explained below by reference to the attached drawings.
First Embodiment of the Invention First, in FIG. 1, a front wheel WF is axially supported on a lower end part of a front fork 12 that is steerably supported on a head pipe 11 disposed at the front end of a vehicle body frame F of this scooter type motorcycle, a rear wheel WR is axially supported on a rear part of a unit-swing engine UE that has a front end part swingably supported on an intermediate part of the vehicle body frame F, and a rear cushion 13 is provided between a rear part of the vehicle body frame F and the unit-swing engine UE. A fuel tank 14 is mounted on the vehicle body frame F in front of the unit-swing engine UE. Furthermore, a tandem type riding seat 15 is disposed above the unit-swing engine UE, the tandem type riding seat 15 being openably and closably supported on the rear part of the vehicle body frame F so that it can be opened sideways.

Part of the unit-swing engine UE, the vehicle body frame F, and the fuel tank 14 are covered by a vehicle body cover 16 made of a synthetic resin, this vehicle body cover 16 including a front cowl 17 covering the head pipe 11 at the front end of the vehicle body frame F from the front, a pair of left and right front side covers 18 connected to left and right sides of the front cowl 17, an inner cover 19 connected to the front side covers 18 so as to cover the head pipe 11 from the rear, leg visor shields 20 joined to the two front side covers 18 and the inner cover 19 so as to cover a front of a leg part of a rider seated on the riding seat 15, a pair of left and right floor center covers 22 extending rearwardly while being connected to the leg visor shields 20 and forming by means of lower end parts footrest parts 21 for the rider to place feet on, a pair of left and right floor side covers 23 hanging down from the outer edges of the footrest parts 21, a pair of left and right body side covers 24 disposed beneath and on opposite sides of the riding seat 15 and extending rearwardly while being connected to the floor side covers 23, and a rear lower cover 25 provided so as to be connected to a lower part on the rear side of the body side covers 24. A floor tunnel part 26 is formed, by means of part of the leg visor shields 20 and the floor center covers 22, from the rear to the head pipe 11 to the underneath of the front end of the riding seat 15, the floor tunnel part 26 bulging upwardly between the two footrest parts 21 and housing the fuel tank 14.

A fuel lid 27 for the supply of fuel to the fuel tank 14 housed in the floor tunnel part 26 is disposed in an upper part of the floor tunnel part 26 so that it can be opened and closed, and a storage box 28 is disposed in the inner cover 19 so that it can be opened and closed. Closed states of the fuel lid 27, the riding seat 15, and the storage box 28 are maintained by means of locking mechanisms 29, 30, and 31, which individually correspond thereto.

Figure 2:
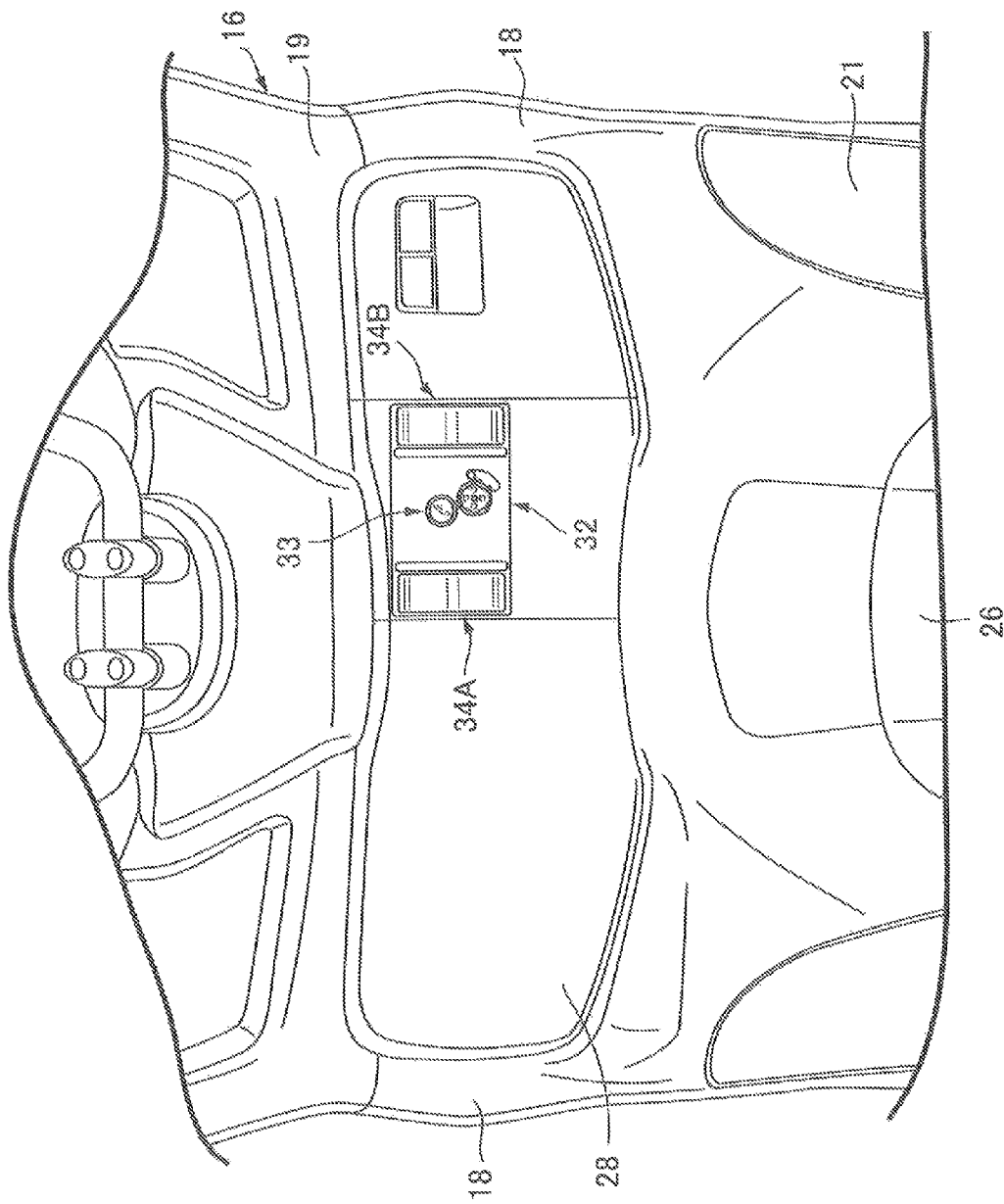
FIG. 2 is a view in the direction of arrow 2 in FIG. 1. (first embodiment)

In FIG. 2, a centralized unlocking operation apparatus 32 in accordance with the present invention is disposed in a middle part in the vehicle width direction of the inner cover 19 of the vehicle body cover 16 at a position adjacent to the storage box 28, the centralized unlocking operation apparatus 32 being formed from a main switch 33 and operating sections 34A and 34B disposed on opposite sides of the main switch 33.

Figure 3:
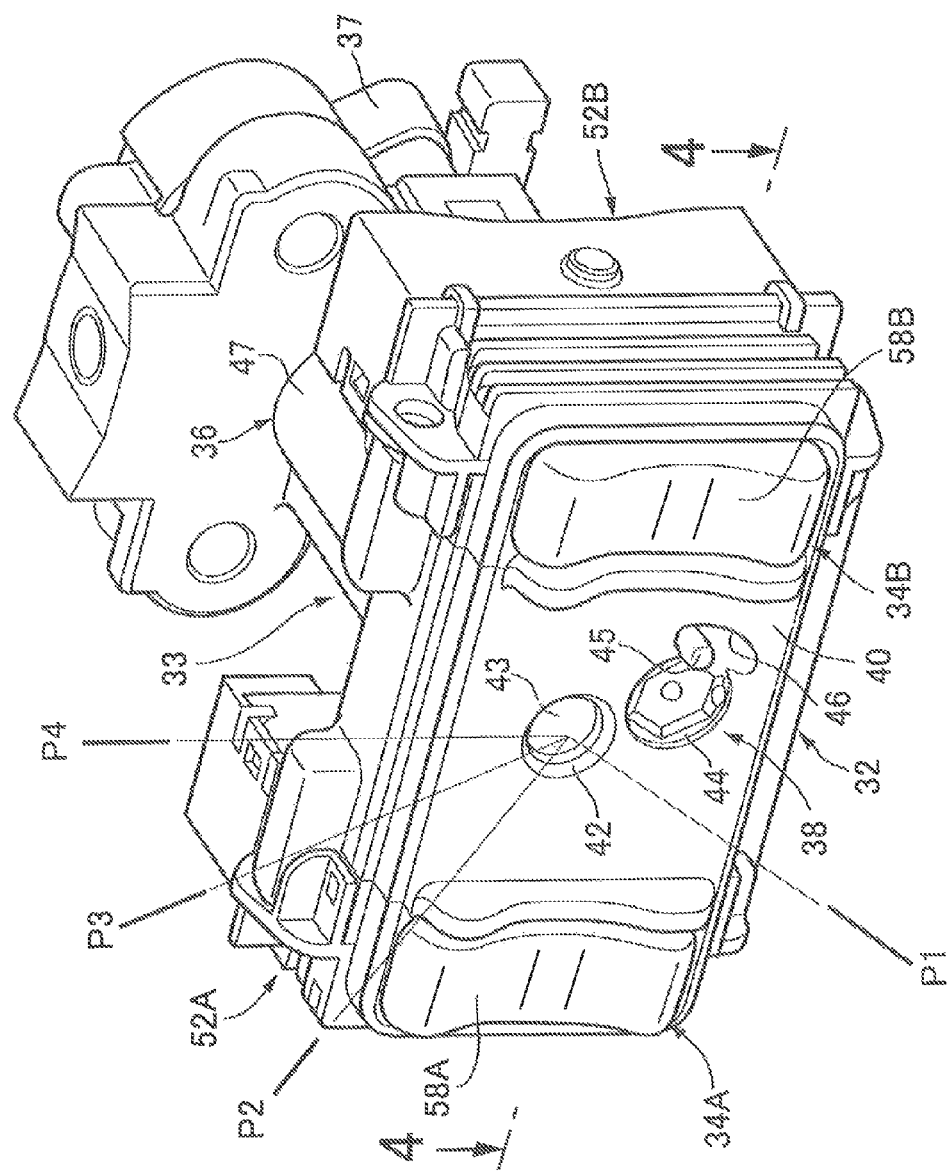
FIG. 3 is a perspective view of a centralized unlocking operation apparatus. (first embodiment)
Figure 4:
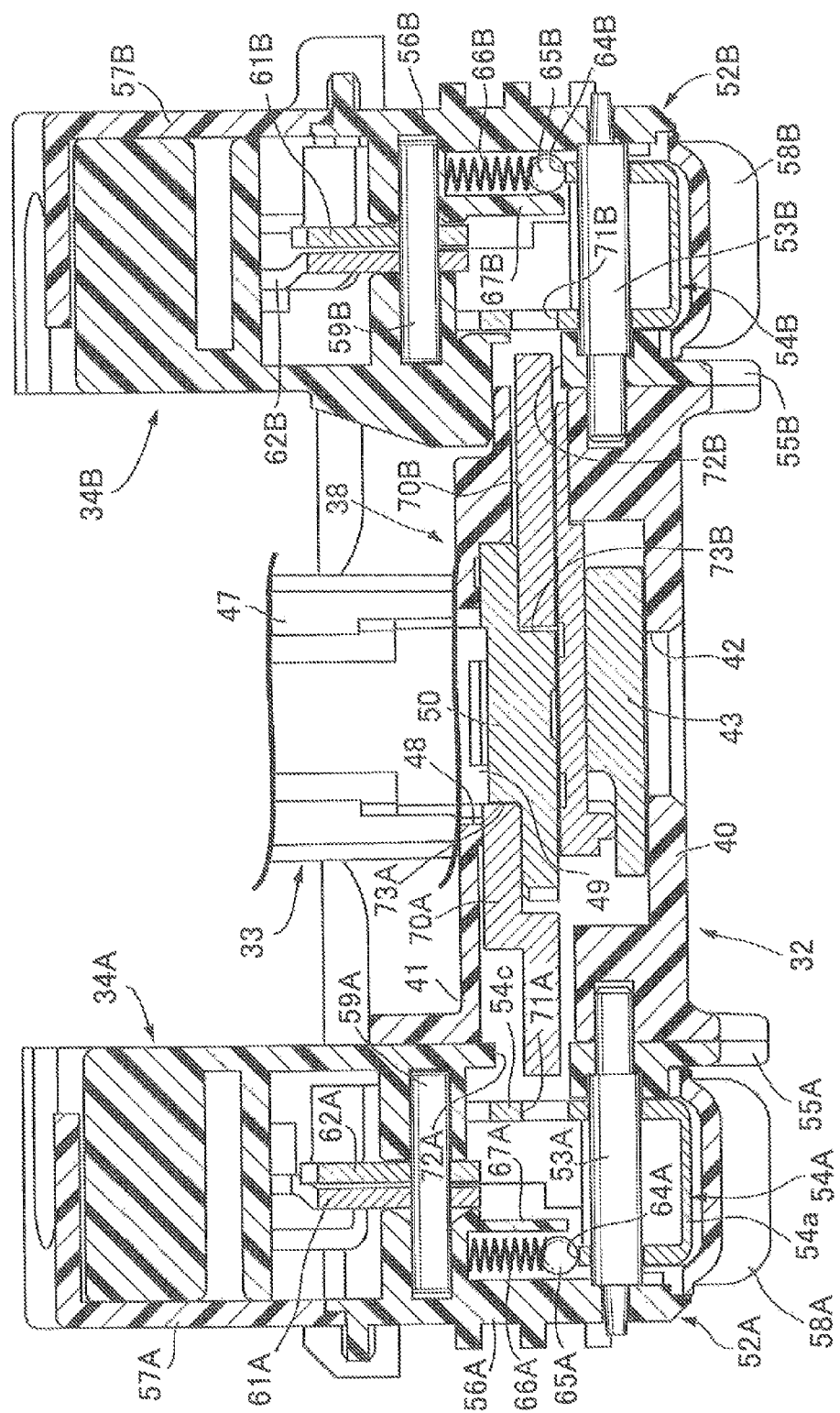
FIG. 4 is a sectional view along line 4-4 in FIG. 3. (first embodiment)
Figure 5:
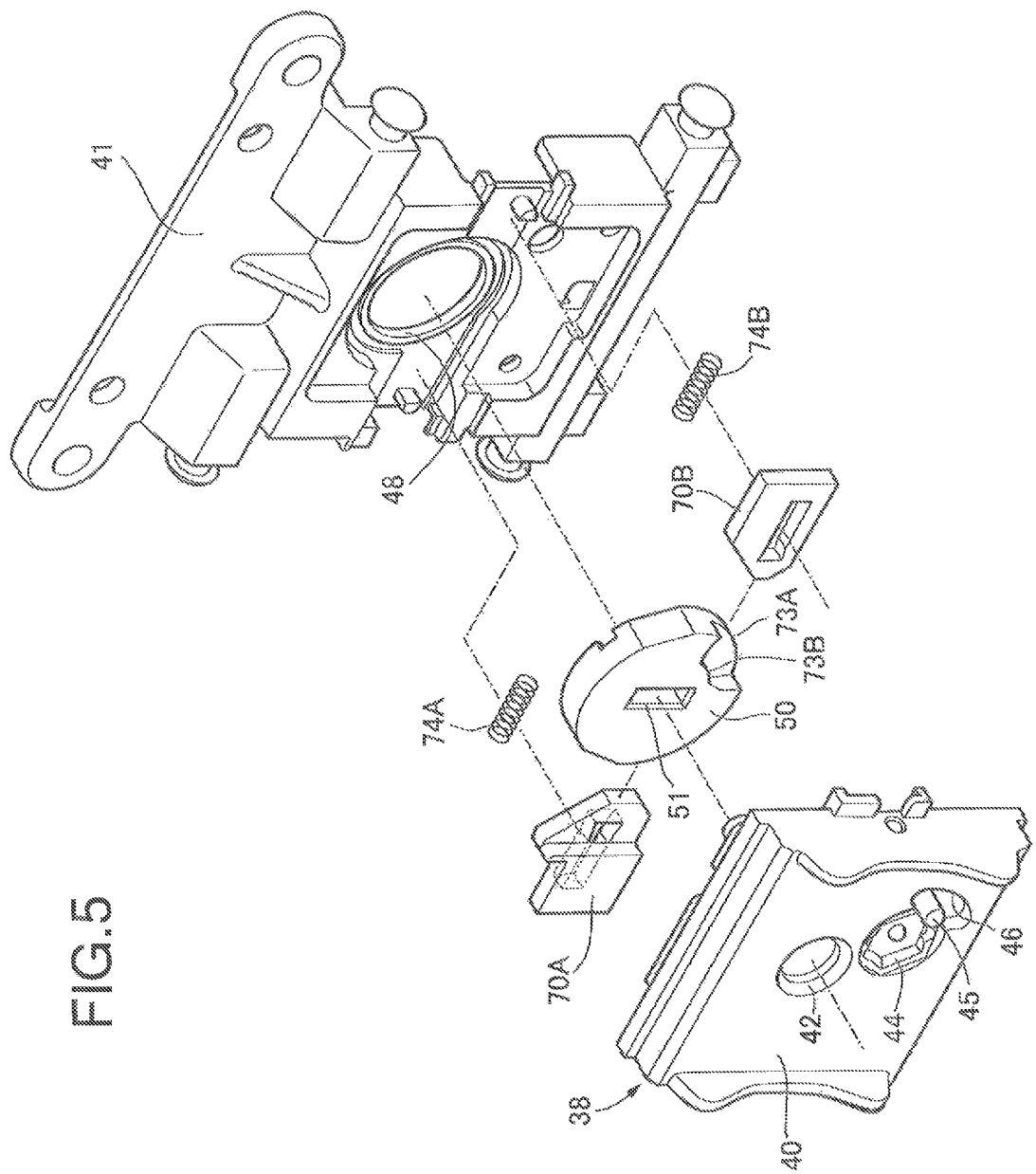
FIG. 5 is an exploded perspective view of an essential part of a main switch. (first embodiment)

Referring in addition to FIG. 3 and FIG. 4, the main switch 33 includes a cylinder lock 36 operated by a mechanical key, an ignition switch 37 provided so as to be connected to one end part of the cylinder lock 36 so as to switch a switching mode by operation of the cylinder lock 36, and a shutter mechanism 38 provided so as to be connected to the other end part of the cylinder lock 36 so as to switch between a state in which insertion of the mechanical key into the cylinder lock 36 is allowed and a state in which insertion is prohibited, the cylinder lock 36 switching not only the switching mode of the ignition switch 37 but also switching between a steering locked state and a steering unlocked state.

The shutter mechanism 38 is formed by pivotably housing a shutter plate 43 between a cover plate 40 fixedly disposed in a middle part in the vehicle width direction of the inner cover 19 and a support plate 41 joined to the cover plate 40, the shutter plate 43 being capable of opening and closing an insertion hole 42 provided in the cover plate 40. The insertion hole 42 is provided in the cover plate 40 so that the mechanical key can be inserted into the cylinder lock 36. Furthermore, a fitting recess 44 is provided in an outer face of the cover plate 40, a magnet key for determining whether or not pivoting of the shutter plate 43 is permitted being fitted into the fitting recess 44, and the shutter plate 43 is pivoted so as to open the insertion hole 42 by means of the magnet key being fitted into the fitting recess 44 and pivoted. When closing the shutter plate 43, a handle 45 projecting from the cover plate 40 may be held and pivoted, and a guide hole 46 for guiding the handle 45 is provided in the cover plate 40 so as to communicate with the fitting recess 44.

Referring in addition to FIG. 4, a cylinder body 47 of the cylinder lock 36 is provided so as to be connected to the support plate 41, an end part, on the shutter mechanism 38 side, of a rotor 49 of the cylinder lock 36 is inserted into a circular opening 48 provided in the support plate 41 so as to correspond to the insertion hole 42, a cam member 50 relatively non-pivotably linked to the rotor 49 is housed between the cover plate 40 and the support plate 41 so as to be disposed between the shutter mechanism 38 and the cylinder lock 36, and a key hole 51 for the mechanical key to be inserted into is provided in the rotor 49 and the cam member 50.

The cylinder lock 36 of the main switch 33 can pivot, as clearly shown in FIG. 3, so as to occupy in sequence a lock position P1, an OFF position P2, an open position P3, and an ON position P4.

Figure 6:
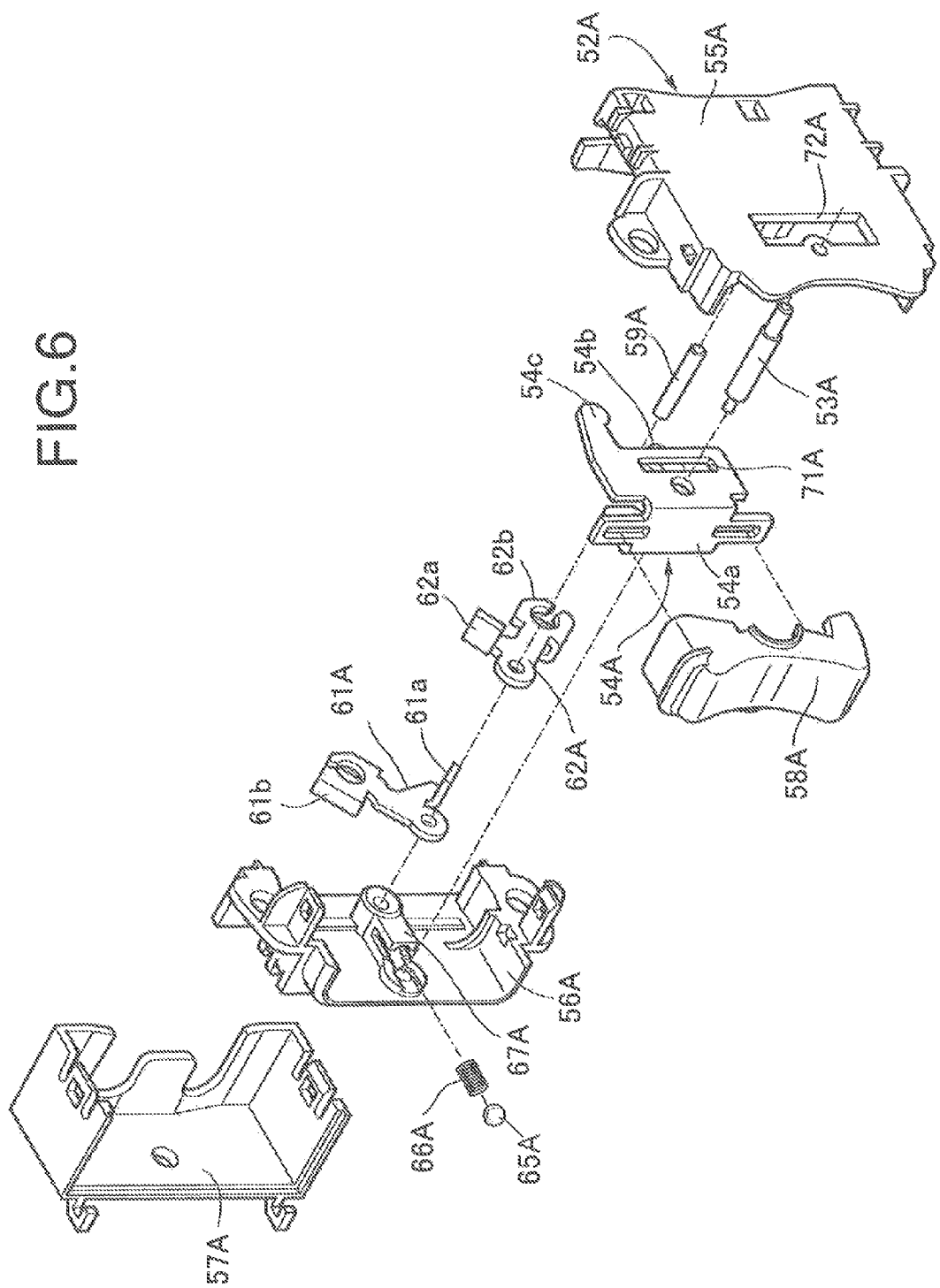
FIG. 6 is an exploded perspective view of an operating section. (first embodiment)

Referring in addition to FIG. 6, the operating section 34A disposed on the left side of the main switch 33 includes a support case 52A fixed to the support plate 41, and an operating or selector element 54A pivotably supported on the support case 52A via a first support shaft 53A.

The support case 52A is formed from a first case member 55A disposed on the shutter mechanism 38 side of the main switch 33, a second case member 56A engaged with the first case member 55A while sandwiching the first case member 55A between itself and the shutter mechanism 38, and a third case member 57A engaged with the first and second case members 55A and 56A, the second case member 56A being secured to the support plate 41.

The first support shaft 53A is provided between the first and second case members 55A and 56A. The operating element 54A includes a support portion 54a having a substantially U-shaped cross-sectional shape and having the first support shaft 53A inserted therethrough, and a pair of pressing portions 54b and 54c extending inwardly from the support portion 54a so as to be disposed on upper and lower sides of the support shaft 53. A cap 58A disposed between the first and second case members 55A and 56A is fitted onto the support portion 54a so that it can pivotingly operate the operating element 54A from the outside.

On the other hand, a pair of levers 61A and 62A pivotably supported on a second support shaft 59A having an axis parallel to the first support shaft 53A and provided between the first and second case members 55A and 56A are disposed within the operating element 54A. Pressure-receiving portions 61a and 62a are provided on the levers 61A and 62A, the pressing portions 54b and 54c of the operating element 54A being capable of individually abutting against the pressure-receiving portions 61a and 62a, and wire linking portions 61b and 62b are also individually provided on the levers 61A and 62A.

Figure 7:
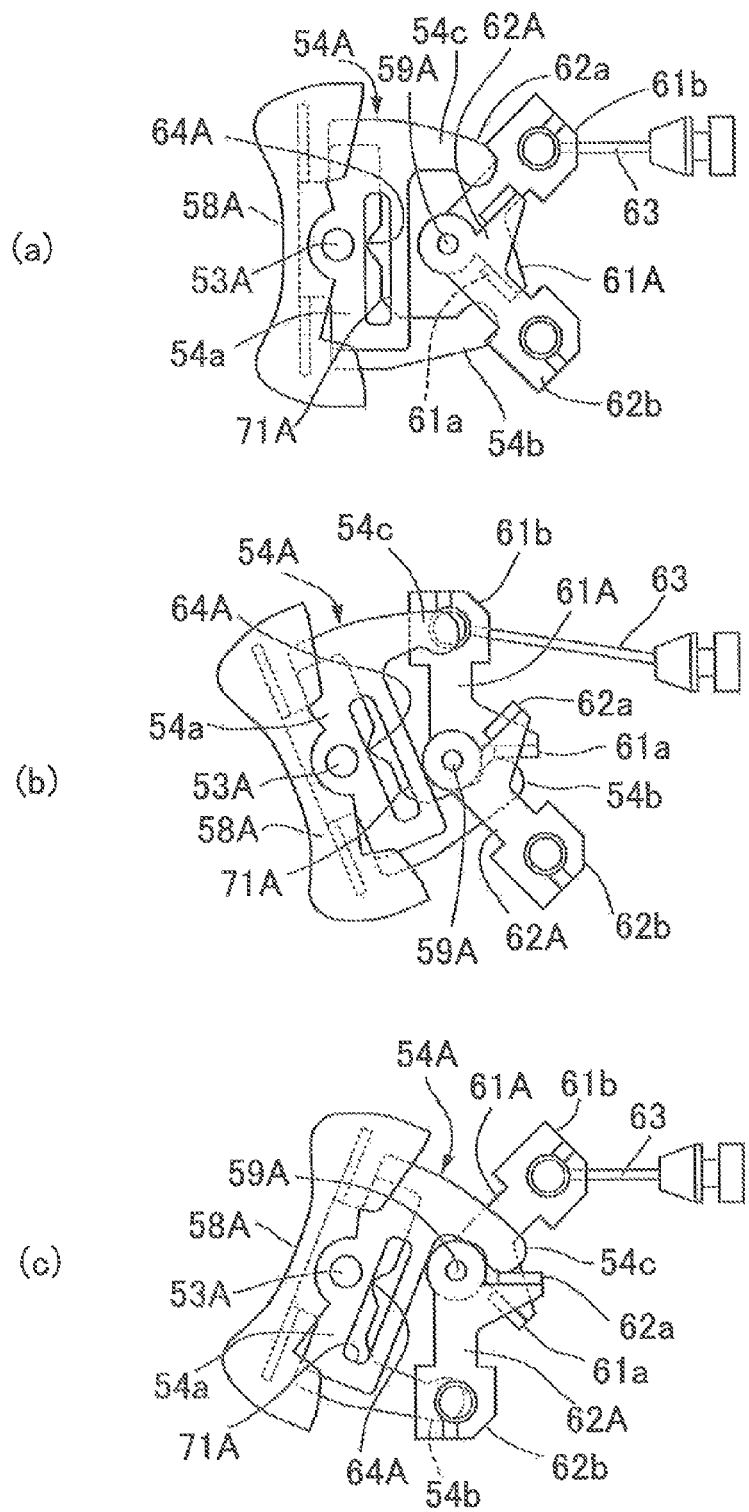
FIG. 7 is a view showing operating states of the operating section. (first embodiment)

The operating element 54A can pivot between a neutral position in which as shown in FIG. 7 (a) neither of the pressing portions 54b and 54c abuts against the pressure-receiving portions 61a and 62a of the levers 61A and 62A, a pivoting position in which as shown in FIG. 7 (b) by pushing a lower part of the cap 58A the pressing portion 54b of the operating element 54A pushes the pressure-receiving portion 61a of the lever 61A so as to pivot the lever 61A, and a pivoting position in which as shown in FIG. 7 (c) by pushing an upper part of the cap 58A the pressing portion 54c of the operating element 54A pushes the pressure-receiving portion 62a of the lever 62A so as to pivot the lever 62A. Linking a wire to the wire linking portions 61b and 62b of the levers 61A and 62A enables the wire to be pulled by putting the operating element 54A at the pivoting positions of FIG. 7 (b) and FIG. 7 (c), but in this embodiment the wire linking portion 62b on the lever 62A side is a spare and a wire is not linked thereto, and a wire 63 for transmitting an operating force for attaining an unlocked state to the locking mechanism 31 of the storage box 28 is linked to the wire linking portion 61b of the lever 61A.

A ball-receiving portion 64A, which is recessed into a triangular shape, is provided in a middle part of the support portion 54a of the operating element 54A, a housing tube 67A housing part of a ball 65A that is in contact with the ball-receiving portion 64A is provided on the second case member 56A of the support case 52A, and a coil-shaped spring 66A provided between the second case member 56A and the ball 65A is housed in the housing tube portion 67A, the coil-shaped spring 66A exhibiting a spring force urging the ball 65A so that it is pressed against the ball-receiving portion 64A. The ball 65A and the spring 66A urge the operating element 54A toward the neutral position as shown in FIG. 7 (a).

The operating section 34B disposed on the right side of the main switch 33 is arranged symmetrically to the operating section 34A disposed on the left side of the main switch 33; parts corresponding to those of the operating section 34A are given the reference letter 'B', and a detailed explanation thereof is omitted.

With regard to this operating section 34B, a wire 68 (see FIG. 1) for transmitting an operating force for attaining an unlocked state to the locking mechanism 30 of the riding seat 15 is linked to a lever 61B that is pivoted by pushing a lower part of a cap 58B, and a wire 69 (see FIG. 1) for transmitting an operating force for attaining an unlocked state to the locking mechanism 29 of the fuel lid 27 is linked to a lever 62B that is pivoted by pushing an upper part of the cap 58B.

A pair of restricting members 70A and 70B are provided between the pair of operating sections 34A and 34B and the cam member 50, which pivots in response to pivoting of the main switch 33, so that one end of each of the restricting members 70A and 70B abuts against the outer periphery of cam member 50, the restricting members 70A and 70B being capable of changing their position in response to the pivoting position of the cam member 50 between an operation allowed position in which operation of the operating elements 54A and 54B is allowed and an operation restricted position in which restricting members 70A and 70B engage with the operating elements 54A and 54B so as to restrict operation of the operating elements 54A and 54B.

Engagement holes 71A and 71B are provided in the operating elements 54A and 54B of the operating sections 34A and 34B, end parts, on the side opposite to the cam member 50, of the restricting members 70A and 70B being inserted through and engaged with the engagement holes 71A and 71B, and through holes 72A and 72B are provided in the first case members 55A and 55B of the support cases 52A and 52B, the restricting members 70A and 70B being inserted through the through holes 72A and 72B.

On the other hand, a cam portion 73A and a cam portion 73B are formed on the outer periphery of the cam member 50 so as to be separated in the axial direction, one end of the restricting member 70A disposed between the cam member 50 and one of the operating sections 34A abutting against the cam portion 73A, and one end of the restricting member 70B disposed between the cam member 50 and the other operating section 34B abutting against the cam portion 73B. The two restricting members 70A and 70B are urged by springs 74A and 74B provided in a compressed state between the restricting members 70A and 70B and the support plate 41 so as to abut against the cam portions 73A and 73B.

Figure 8:
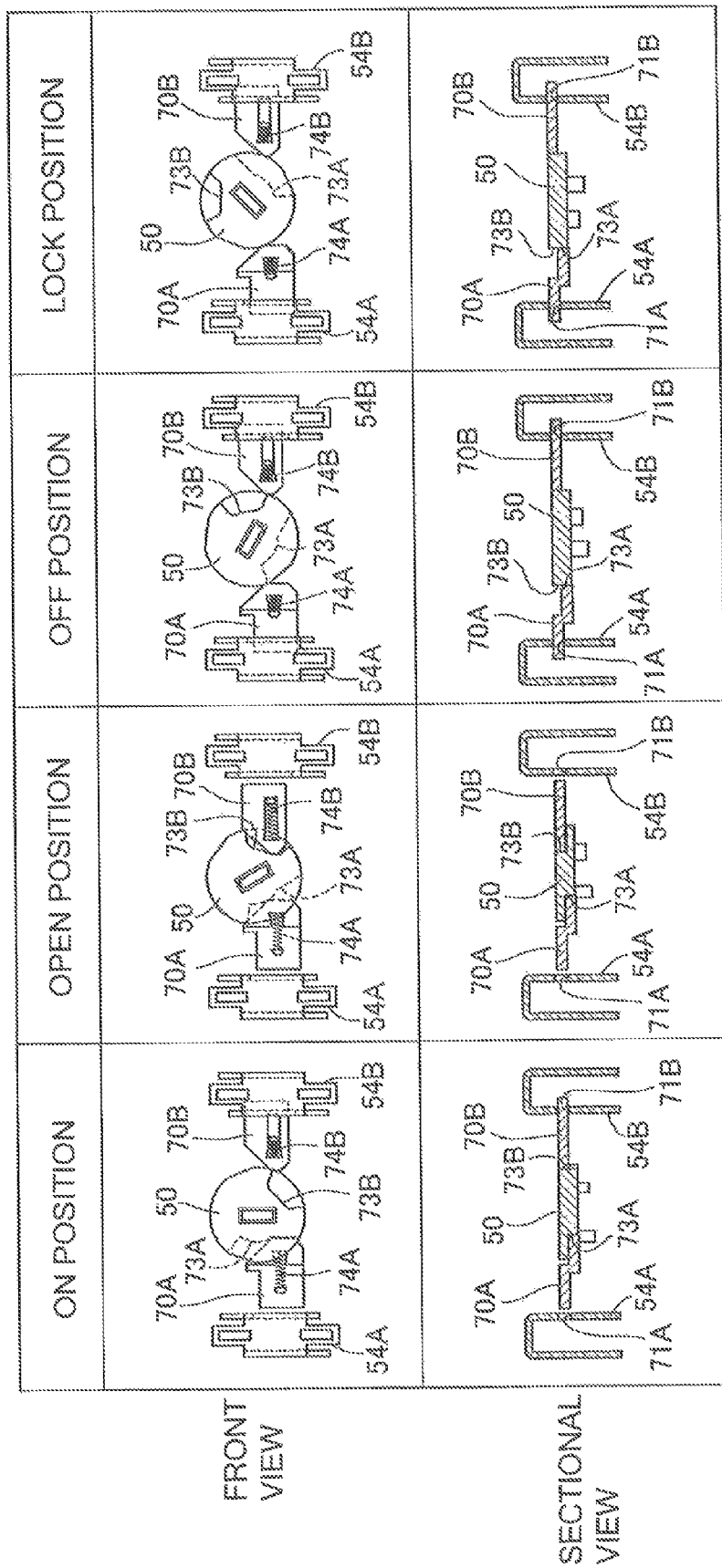
FIG. 8 shows a front view and a sectional view for explaining change in position of a restricting member displaced according to the pivoting position of a cam member. (first embodiment)

As shown in FIG. 8, the cam portion 73A, against which one restricting member 70A is made to abut, is formed so as to restrict pivoting of the operating element 54A by making the restricting member 70A be inserted through and engaged with the engagement hole 71A of the operating element 54A when the main switch 33 is at the OFF position or the lock position. The cam portion 73B, against which the other restricting member 70B is made to abut, is formed so as to restrict pivoting of the operating element 54B by making the restricting member 70B be inserted through and engaged with the engagement hole 71B of the operating element 54B when the main switch 33 is at the ON position, the OFF position, or the lock position. That is, the locking mechanism 31 of the storage box 28 can be put into an unlocked state by operating the operating section 34A when the main switch 33 is at the ON position or the open position, and the locking mechanism 29 of the fuel lid 27 and the locking mechanism 30 of the riding seat 15 can be put into an unlocked state by operating the operating section 34B when the main switch 33 is at the open position.

The operation of this embodiment is now explained. Since the pair of operating sections 34A and 34B, which enable the plurality of locking mechanisms 31; 29, 30 to be put into an unlocked state by means of the operating elements 54A, 54B and, when the main switch 33 is at a predetermined pivoted position, restrict operation of the operating elements 54A and 54B, are disposed on opposite sides of the main switch 33, it is possible to increase the number of locking mechanisms 29 to 31 that can be operated so as to be put into an unlocked state.

Furthermore, since the pair of restricting members 70A and 70B are provided between the cam member 50, which pivots in response to pivoting of the main switch 33, and the pair of operating sections 34A and 34B so that one end of each of the restricting members 70A and 70B abuts against the outer periphery of the cam member 50, the restricting members 70A and 70B being capable of changing their position, in response to the pivoting position of the cam member 50, between the operation allowed position, in which operation of the operating elements 54A and 54B is allowed, and the operation restricted position, in which they engage with the operating elements 54A and 54B so as to restrict operation of the operating elements 54A and 54B, it becomes possible to restrict operation of the pair of operating sections 34A and 34B in response to the pivoted position of the main switch 33 by means of a simple arrangement.

Furthermore, since the cam portion 73A, against which one end of one restricting member 70A is made to abut, and the cam portion 73B, against which one end of the other restricting member 70B is made to abut, are formed on the outer periphery of the cam member 50 so as to be separated in the axial direction, even when the pivoted positions of the main switch 33 for carrying out restriction of operation of the pair of operating sections 34A and 34B are different from each other, it is possible to mutually independently set restriction of operation of the two operating sections 34A and 34B in response to the pivoted position of the main switch 33. That is, with regard to one of the operating sections 43A, when the main switch 33 is at the OFF position or the lock position, an operation that puts the locking mechanism 31 of the storage box 28 into an unlocked state is restricted, and with regard to the other operating section 43B, when the main switch 33 is at the ON position, the OFF position, or the lock position, an operation that puts the locking mechanism 29 of the fuel lid 27 and the locking mechanism 30 of the riding seat 15 into an unlocked state is restricted; the pivoted positions of the main switch 33 for restricting operation of the two operating sections 34A and 34B are different from each other, but it is possible to mutually independently set restriction of operation of the two operating sections 34A and 34B.

An embodiment of the present invention is explained above, but the present invention is not limited to the embodiment and may be modified in a variety of ways as long as the modifications do not depart from the spirit and scope thereof.

For example, in the embodiment above, the main switch 33 is pivotingly operated by the mechanical key, but the present invention may be applied to a smart system in which when a vehicle user carries a legitimate portable apparatus the switching mode of an ignition switch is changed by pivoting of a knob.

The invention claimed is:

1. A centralized unlocking operation apparatus for a vehicle locking mechanism, the apparatus comprising:
   a main switch that is pivotally operable, and
   a pair of operating sections that each includes an associated operating element, that enable a plurality of locking mechanisms to be put into an unlocked state by the associated operating element, and that restrict operation of the associated operating element when the main switch is at a predetermined pivoted position,
   wherein the pair of the operating sections are disposed on opposite sides of the main switch,
   wherein the main switch includes a pair of restricting members provided between a cam member that pivots in response to a pivoting operation of the main switch and the pair of operating sections such that one end of each of the restricting members abuts against an outer periphery of the cam member, the restricting members change positions thereof in response to movement of the cam member between an operation allowed position in which operation of the operating elements is allowed and an operation restricted position in which operation of the operating elements is restricted by engagement with the operating elements, and
   wherein a cam portion against which one end of one of the restricting members is made to abut and a cam portion against which one end of the other restricting member is made to abut are formed on the outer periphery of the cam member so as to be separated in an axial direction of the cam member.

2. The centralized unlocking operation apparatus for a vehicle locking mechanism according to claim 1, further comprising:
   a pair of operating sections disposed on opposite sides of the main switch, each of the operating sections comprising an associated selector element.

3. The centralized unlocking operation apparatus for a vehicle locking mechanism according to claim 2, wherein each of the operating sections includes a support case, and each of the selector elements is pivotably supported on the support case via a first support shaft.

4. The centralized unlocking operation apparatus for a vehicle locking mechanism according to claim 2, wherein each of the selector elements include a support portion having a substantially U-shaped cross-sectional shape and having a first support shaft inserted therethrough, and a pair of pressing portions extending inwardly from the support portion so as to be disposed on upper and lower sides of the support shaft.

5. The centralized unlocking operation apparatus for a vehicle locking mechanism according to claim 2, wherein each of operating sections independently restricts of operation of the operating sections based on a pivoted position of the main switch.

6. A centralized unlocking operation apparatus for a vehicle locking mechanism, the apparatus comprising:
   a main switch that is pivotally operated,
   a pair of operating sections disposed on opposite sides of the main switch, each of the operating sections comprising an associated selector element,
   a cam member which pivots in response to pivoting of the main switch, and
   a pair of restricting members provided between the cam member and the pair of operating sections, each of the restricting members abutting against an outer periphery of the cam member,
   wherein:
   the operating sections cooperate to enable a plurality of locking mechanisms to be selectively put into an unlocked state by pivotally operating selector elements associated therewith;
   the operating sections restrict pivoting operation of the selector elements when the main switch is at a first predetermined pivoted position thereof; and
   the operating sections also selectively unlock one of locking mechanisms by pivotally operating the selector element associated therewith when the main switch is at a second predetermined pivoted position thereof, the pair of restricting members change their positions in response to pivoting movement of the cam member between an operation allowed position thereof, in which operation of the selector elements is allowed, and an operation restricted position thereof, in which operation of the selector elements is restricted by engagement with the restricting members, in response to pivoting operation of the main switch.

7. The centralized unlocking operation apparatus for a vehicle locking mechanism according to claim 6, wherein one cam portion against which one end of one of the restricting members is made to abut and another cam portion against which one end of the other restricting member is made to abut are formed on the outer periphery of the cam member so as to be separated in an axial direction of the cam member.

8. The centralized unlocking operation apparatus for a vehicle locking mechanism according to claim 7, wherein each of the operating sections includes a support case, and each of the selector elements is pivotally supported on the support case via a first support shaft.

9. The centralized unlocking operation apparatus for a vehicle locking mechanism according to claim 7, wherein each of the selector elements include a support portion having a substantially U-shaped cross-sectional shape and having a first support shaft inserted therethrough, and a pair of pressing portions extending inwardly from the support portion so as to be disposed on upper and lower sides of the support shaft.

10. The centralized unlocking operation apparatus for a vehicle locking mechanism according to claim 7, wherein each of operating sections independently restricts of operation of the operating sections based on a pivoted position of the main switch.

* * * * *